Oct. 13, 1964 M. G. CHATELAIN 3,153,235

CONCAVE POLYHEDRAL REFLECTOR

Filed March 27, 1961 2 Sheets-Sheet 1

INVENTOR.
MAURICE G. CHATELAIN
BY
Knox & Knox

Oct. 13, 1964 M. G. CHATELAIN 3,153,235

CONCAVE POLYHEDRAL REFLECTOR

Filed March 27, 1961 2 Sheets-Sheet 2

*INVENTOR.*

MAURICE G. CHATELAIN

*BY*

*Knox & Knox*

United States Patent Office 3,153,235

Patented Oct. 13, 1964

3,153,235

CONCAVE POLYHEDRAL REFLECTOR

Maurice G. Chatelain, San Diego, Calif., assignor to The Ryan Aeronautical Co., San Diego, Calif.

Filed Mar. 27, 1961, Ser. No. 98,658
15 Claims. (Cl. 343—18)

This invention relates to a communication system, and more particularly to a reflector of radiations of the type used in communication systems.

*Background*

The success of the "Echo" satellite has opened up new possibilities of world-wide communications. As is well known, the Echo satellite is a balloon about 100 feet in diameter, the balloon traveling in an orbit around the earth. Radiation that contains information such as telephone conversations, television pictures, radar messages, codes, and the like are directed at the balloon. These radiations impinge upon and are reflected by the reflective surface of the balloon. Since the balloon merely acts as a mirror, and does not require any power, it is known as a "passive" element.

It has been computed that only about one-third of the balloon's surface received radiation, the rest of the balloon's surface being in the "shadow." Of the radiation-receiving surface, theoretically only one spot is at the precise angle to reflect radiation back to a given spot on the earth.

From the foregoing discussion it will be realized that most of the radiations are "forward scattered" into space, and that only a minute percentage of the radiation directed at the balloon is "backscattered" and reflected back to earth. This means that the reflected signal that is received must be greatly amplified; a procedure which, for technical reasons, is undesirable.

It is therefore of great value to be able to reflect a larger percentage of the radiations back to earth.

A somewhat similar situation arises in connection with communications here on earth. Frequently, the same information must be transmitted to a number of different locations. It would be desirable to be able to position a reflective element atop a mountain, and to beam information-bearing radiation thereat. Due to the multi-directional reflections, a plurality of receivers may then be aimed at the reflector, and each receiver would be enabled to pick up the information.

Here again, a strong reflection is highly desirable. Transmission of information by means of light waves is now also feasible because of recent developments. This technology has successfully produced "coherent" light, that is, light which is so well collimated that it forms an exceedingly fine, non-divergent pencil of light. The availability of coherent light indicates that light beams (which are another form of radiation) can be used to transmit efficiently information from one location to another. Thus light beams may also be reflected from satellites or from reflectors placed on mountain tops.

It is therefore the principal object of my invention to provide an improved radiation reflector.

It is another object of my invention to provide a radiation reflector that reflects a greater proportion of impinging radiation than prior art devices.

It is a further object of my invention to provide an improved reflector that is capable of reflecting radio waves or light beams.

The attainment of these objects and others will be realized from the following specification taken in conjunction with the drawings, of which:

Broadly speaking, my invention contemplates a polyhedron whose faces and facial configurations are such that the polyhedron reflects a larger proportion of the impinging radiation than prior-art devices. In this specification, including the claims, the more generic term "face" and the more specific term "composite face" may refer to the same concept and the exact meaning should be construed with reference to the context.

It will be recalled from the previous discussion that a spherical surface reflects only a single ray of radiation at a given angle, and that the reflection takes place from a point of infinitely small area.

Figures 1, 2, 3, 4:
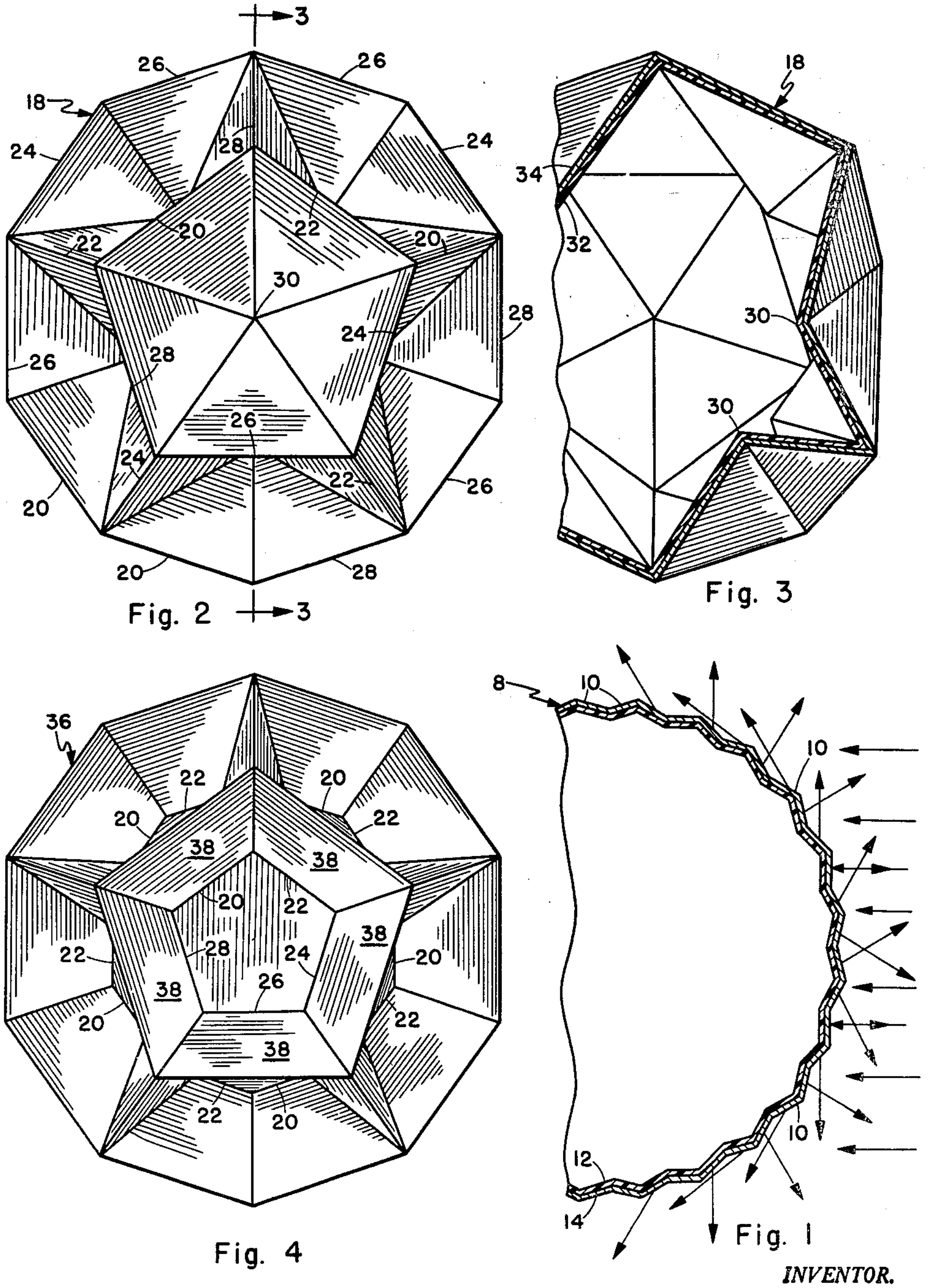
FIGURE 1 shows the reflections produced by a polyhedron having seventy-two faces.
FIGURE 2 shows a twelve-faced dodecahedron modified according to my invention.
FIGURE 3 is a fragmentary cross section of view of my modified dodecahedron.
FIGURE 4 shows another dodecahedron modified in accordance with my invention.

On FIGURE 1, I show a fragmentary cross section of a polyhedron generally indicated at 8, that is, a "ball" whose surface may be considered as a single composite face with flat facets 10. Polyhedron 8 comprises a skin 12 of plastic or some other suitable material, and is inflated by a gas. A reflective coating 14 is positioned on skin 12.

As shown, incoming radiations, indicated by directional arrows, impinge on polyhedron 8, and are reflected from the various faces thereof. It turns out that if polyhedron 8 has 720 faces, two of them reflect radiation in the same direction. When this result is compared with the reflection characteristics of a spherical surface, the following advantages are noted. Whereas a sphere 30 meters in diameter has only a single reflecting spot, a 30-meter-diameter 720 faced polyhedron has two reflective faces. Each face of the polyhedron has an area of 4 square meters. It may be seen that this polyhedron has a decided advantage over a sphere from a reflection point of view, the advantage being expressed as having a "directivity" of 37 decibels at 3 kilomegacycles.

A polyhedron having twelve faces is known as a "dodecahedron." In a 30-meter dodecahedron, each face has an area of 236 square meters, and its "directivity" increases 54 decibels at 3 kilomegacycles. However, the dodecahedron has some orientations wherein none of its twelve faces will be in position to reflect the radiation to a desired location.

My invention modifies a dodecahedron, or other polyhedron, so that it will be useful at any orientation. FIGURE 2 shows a dodecahedron modified in accordance with my invention. As previously indicated, a standard dodecahedron has twelve flat faces. In FIGURE 2, the composite faces are now generally concave, or inwardly-pointing pyramids. Reference characters 20, 22, 24, 26, and 28 indicate the edges that would ordinarily define a flat facet. In accordance with my invention however these edges now define the hypothetical base of a concave pyramid, which is now a composite face of my modified dodecahedron. Thus each composite face now comprises the facets that form the pyramid, reference character 30 representing the apex of the inwardly-pointing pyramid.

In the view shown in FIGURE 2, the observer sees a central concave pyramid, and some of the facets of five more surrounding generally concave or hollow pyramids; for a total of six pyramidal composite faces. There are six additional pyramids on the back of dodecahedron 18, making a total of twelve inwardly-pointing pyramids or composite faces.

FIGURE 3 shows a fragmentary cross sectional view of my modified dodecahedron 18. As shown, it comprises a skin 32, which is inflated as previously described. Skin 32 is coated with a metalized, or otherwise radiation reflective coating 34. As shown is FIGURE 3, dodecahedron 18 comprises inwardly directed pyramids, reference character 30 again indicating the apexes. Thus the modified dodecahedron has sixty inclined planar facets, each of which is capable of reflecting radiation.

Impinging radiation is reflected between the various facets, and most of the radiation is re-directed back toward the earth.

*A Further Embodiment*

FIGURE 4 shows another modification of a dodecahedron. This comprises a standard twelve-faced dodecahedron, wherein the flat base portions of the composite faces are defined by edges 20–28. In the embodiment of FIGURE 4, each flat base portion is surrounded by planar facets in the form of oblique walls 38. These may be positioned at an angle of 135 degrees to the flat base portion.

Again each composite face now comprises a generally concave bowl having a flat bottom and planar facets. Impinging radiation is reflected between the base portion and the various facets; a good portion of the radiation being thus re-directed back toward the source of radiation.

*Another Embodiment*

Figure 5:
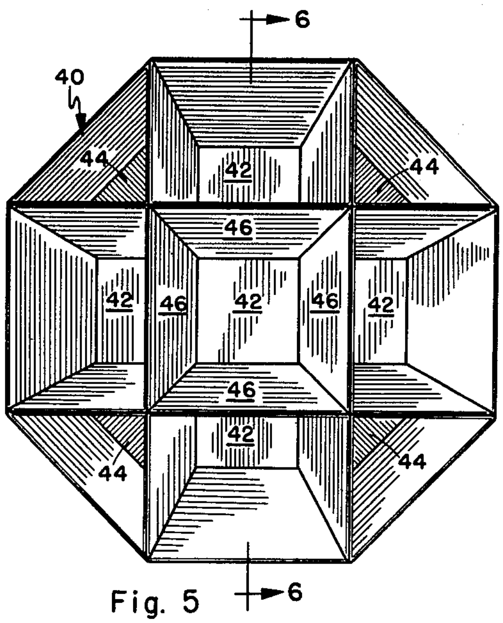
FIGURE 5 shows an icosahexahedron modified in accordance with my invention.

FIGURE 5 shows another embodiment of my invention. This configuration 40 is known as an "icosahexahedron." It has eighteen square facets 42 and eight triangular facets 44, each facet being surrounded by facets in the form of oblique walls as discussed in connection with FIGURE 4.

Here again, each composite face is bowl-shaped; and impinging radiation bounces between the facets and bottom to be reflected back to earth.

In FIGURE 5 the bowl-shaped composite faces include a flat bottom portion which may be either a square shaped facet such as 42 or a triangular-shaped facet such as 44. Four oblique walls 46 surround each square facet 42, and three oblique walls surround each triangular facet 44. The oblique wall may be at an angle of 135 degrees as previously discussed.

Figure 6:
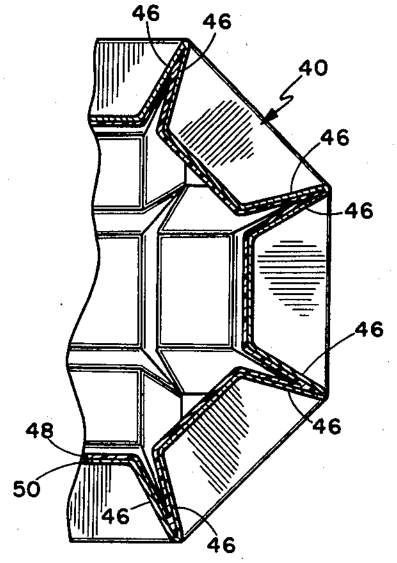
FIGURE 6 is a fragmentary view of my modified icosahexahedron.

The cross sectional view of FIGURE 6 shows how icosahexahedron 40 is formed. It comprises a skin 48 that is inflated by any suitable means. When it is inflated, skin 48 forms flat square facets, flat triangular facets, and oblique walls as previously described. The outer surface of skin 48 is covered with a reflective coating 50, such as a thin metallized film. This film reflects radiation, and light, if light is to be used.

Thus each composite face comprises either four or five reflective surfaces, and the radiation impinges upon and is reflected therefrom in the well known manner. Thus a greater proportion of the impinging radiation is backscattered toward the source of radiations.

The embodiments of FIGURES 4 and 5 have an additional feature. Radiation impinging upon the flat base portions is reflected in a substantially parallel narrow beam, and will therefore travel a long distance to impinge upon a relatively small area.

Simultaneously, some of the impinging radiation falls upon the oblique walls, but this radiation, due to the multiple reflections from the oblique walls, is reflected in a plurality of directions. These diverging reflections form a wide-angled reflected beam, whose radiations are able to be picked up by a plurality of spaced-apart receivers.

*Summary*

It has been shown that my modified polyhedrons are inherently better reflectors than a sphere. Their configurations are such that, regardless of their orientation, substantially the same uniform reflections are always obtained. My reflectors are not limited to use as a satellite, but may be used as mountain-top or tower-mounted relay stations.

It is understood that minor variation from the form of the invention disclosed herein may be made without departure from the spirit and scope of the invention, and that the specification and drawing are to be considered as merely illustrative rather than limiting.

I claim:

1. A reflector antenna having a hollow, expansible polyhedral body consisting of a plurality of inwardly extending recesses.

2. A radiation reflector comprising: an expansible polyhedron, the outer surface thereof consisting of a plurality of generally concave composite faces, each defined by a plurality of planar reflecting facets.

3. A radiation reflector comprising: an inflatable polyhedron, the outer surface thereof having a plurality of generally concave composite faces partly defined by a plurality of planar facets, certain of said facets being positioned to form a pyramid whose apex is directed inwardly of said polyhedral surface.

4. A radiation reflector comprising:
a dodecahedron comprising a skin of plastic material;
each face of said dodecahedron defining a concave pyramid, each said pyramid consisting of planar facets;
and a radiation-reflective coating on the external surfaces of said facets, whereby radiation impinging on said dodecahedron is reflected generally back toward the source of said radiations.

5. A radiation reflector comprising:
an inflatable dodecahedron having twelve pentagonal faces, said dodecahedron comprising a skin of plastic material;
each face of said dodecahedron defining a concave pyramid, each said pyramid having five planar facets;
and a radiation-reflective coating on the external surfaces of said planar facets, whereby radiation impinging on said dodecahedron is reflected generally back toward the source of said radiations.

6. A radiation reflector comprising a polyhedral surface having a plurality of flat pentagonal faces, each said pentagonal face being surrounded by flat oblique walls.

7. A radiation reflector comprising:
a dodecahedron having twelve pentagonal bottom portions surrounded by flat oblique walls;
and a radiation reflecting coating on the external surface of said oblique walls.

8. The combination of claim 7 wherein said oblique walls are at an angle of 135 degress to said flat bottom portions.

9. A radiation reflector comprising:
an inflatable dodecahedron having twelve pentagonal faces, each said face comprising a flat pentagonal bottom portion and five surrounding planar oblique walls at an angle of 135 degrees to said flat bottom portion, said dodecahedron comprising a plastic skin;
and a radiation reflecting coating positioned on the external surfaces of said walls and said flat bottom portion.

10. A radiation reflector comprising:
an icosahexahedron having eighteen square flat bottom portions and eight triangular flat bottom portions, each said bottom portion being surrounded by oblique walls;
and a radiation reflecting coating on the external surface of said oblique walls.

11. The combination of claim 10 wherein said oblique walls are at an angle of 135 degrees to said flat bottom portions.

12. A radiation reflector comprising:
an inflatable icosahexahedron having twenty-six faces, eighteen of said faces comprising flat square bottom portions, and eight of said faces comprising flat triangular bottom portions;

said faces further comprising four oblique walls at an angle of 135 degrees with respect to said bottom portion surrounding each said square bottom portion and three oblique walls at an angle of 135 degrees with respect to said bottom portion surrounding each said triangular bottom portion, said icosahexahedron comprising a plastic skin;

and a radiation reflecting coating positioned on the external surfaces of said walls and bottom portions.

13. A radiation reflector as claimed in claim 2 further including a radiation reflective coating on the outer surface of said facets.

14. A radiation reflector comprising:

an inflatable polyhedron, the outer surface thereof having a plurality of generally concave reflecting surfaces.

15. A radiation reflector comprising:

an inflatable polyhedron, each face of the polyhedron being defined by a generally concave recess and each recess being defined by a plurality of planar reflecting facets.

References Cited by the Examiner

UNITED STATES PATENTS

| | | | |
|---|---|---|---|
| 2,520,008 | 8/50 | King | 343—18 |
| 2,778,010 | 1/57 | Leonard | 343—18 |

KATHLEEN H. CLAFFY, *Primary Examiner.*

CHESTER, L. JUSTUS, LEWIS H. MYERS, *Examiners.*